Figure 1:
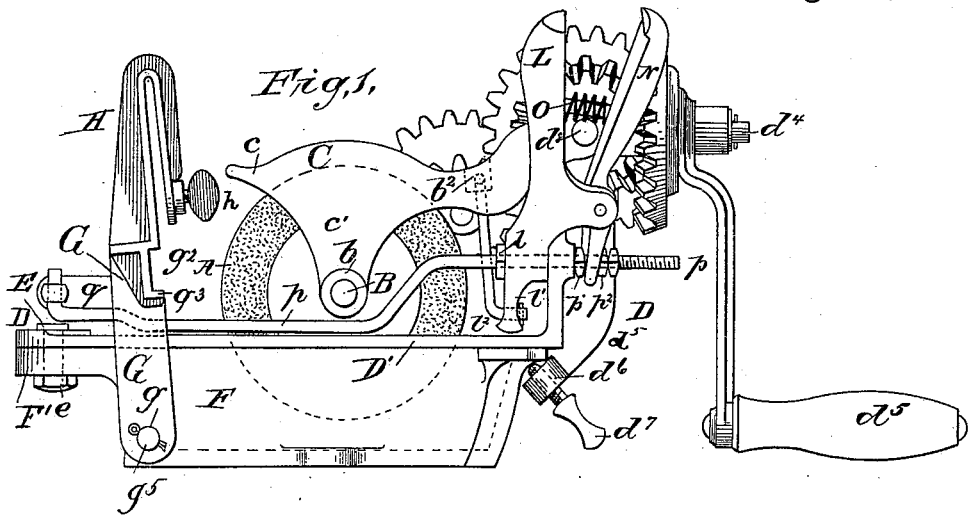

(Model.) 6 Sheets—Sheet 1.

R. DUTTON.
MACHINE FOR GRINDING MOWER KNIVES.

No. 481,275. Patented Aug. 23, 1892.

Witnesses:

Inventor,
Rufus Dutton
By D. Walter Brown
His Attorney

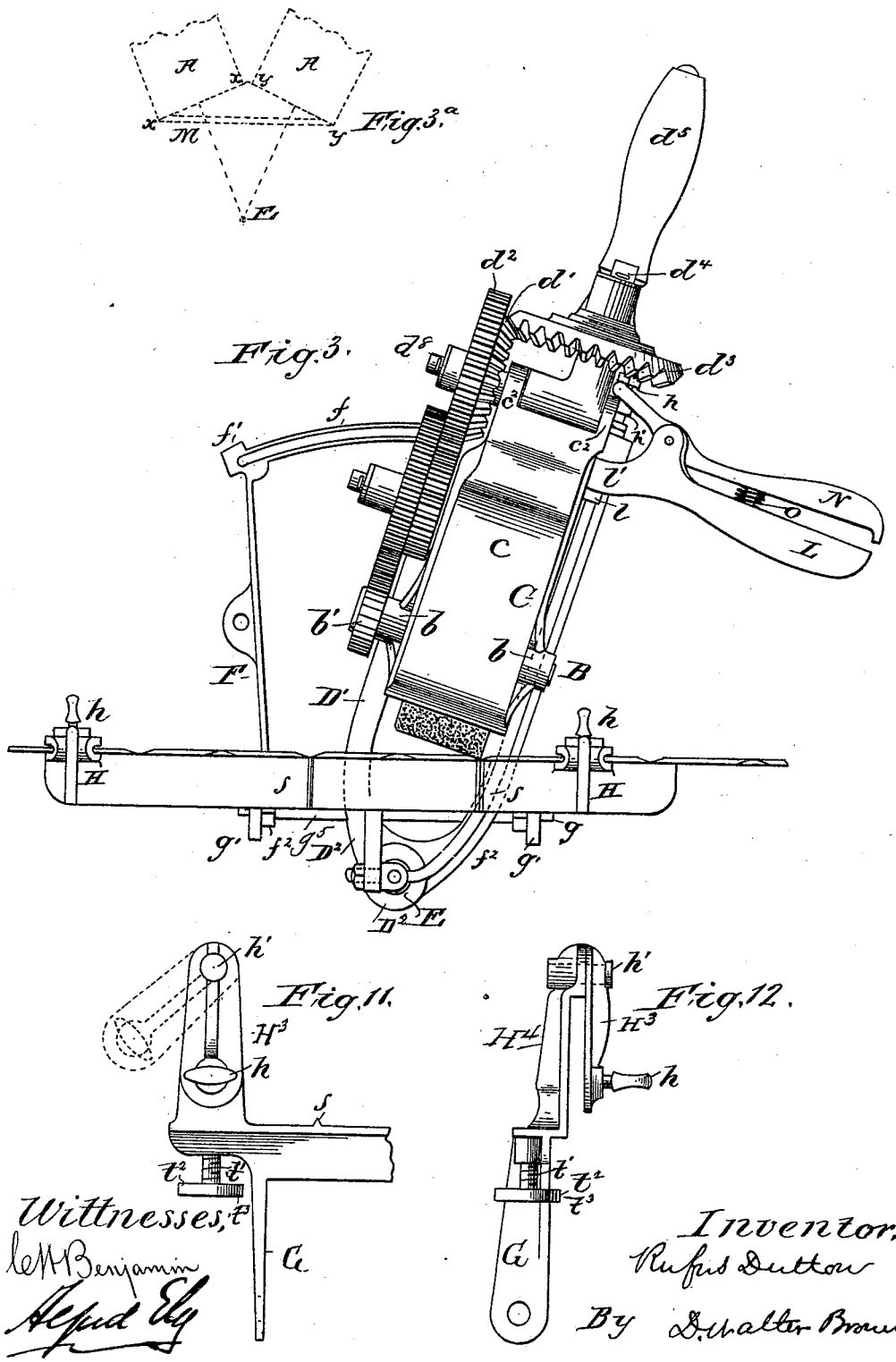

(Model.) 6 Sheets—Sheet 3.
R. DUTTON.
MACHINE FOR GRINDING MOWER KNIVES.

No. 481,275. Patented Aug. 23, 1892.

Witnesses:
C. H. Benjamin
Alfred Ely

Inventor:
Rufus Dutton
By D. Walter Brown
his Attorney.

(Model.)
R. DUTTON.
MACHINE FOR GRINDING MOWER KNIVES.
No. 481,275. Patented Aug. 23, 1892.
6 Sheets—Sheet 4.
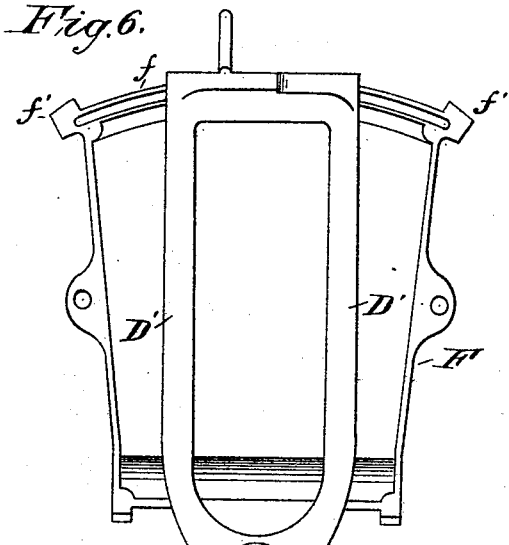
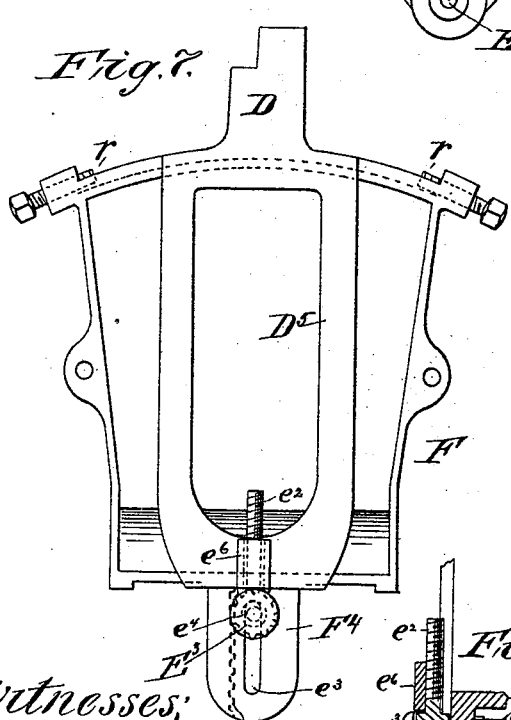
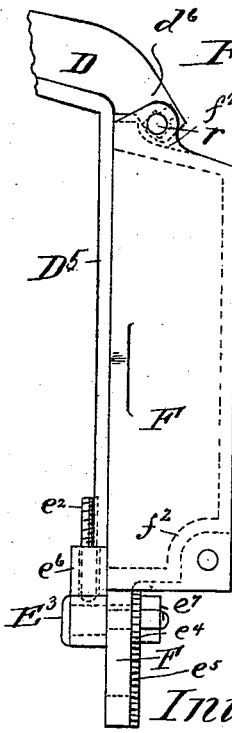
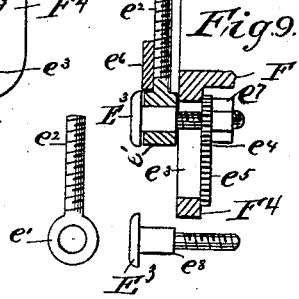
Witnesses:
W. M. Benjamin
Sigrid Ely
Inventor:
Rufus Dutton
By S. Walter Brown
his Attorney (Model.)  
6 Sheets—Sheet 5.

R. DUTTON.
MACHINE FOR GRINDING MOWER KNIVES.

No. 481,275. Patented Aug. 23, 1892.

Witnesses:  
C. W. Benjamin  
Alfred Ely

Inventor:  
Rufus Dutton  
By S. Walter Brown  
his Attorney.

(Model.)
6 Sheets—Sheet 6.
R. DUTTON.
MACHINE FOR GRINDING MOWER KNIVES.
No. 481,275.  Patented Aug. 23, 1892.
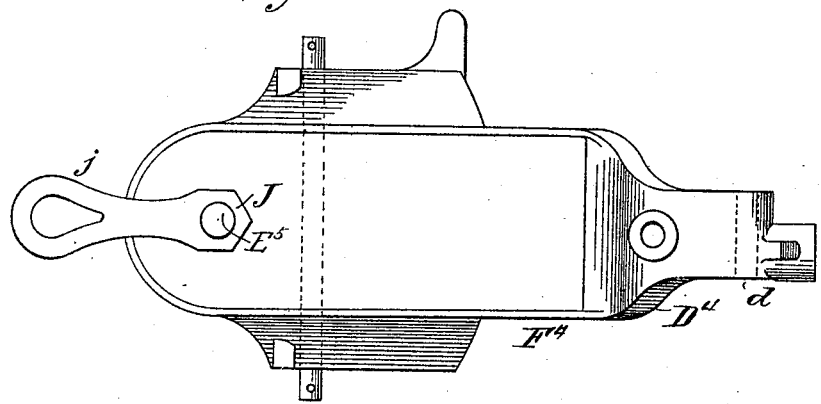
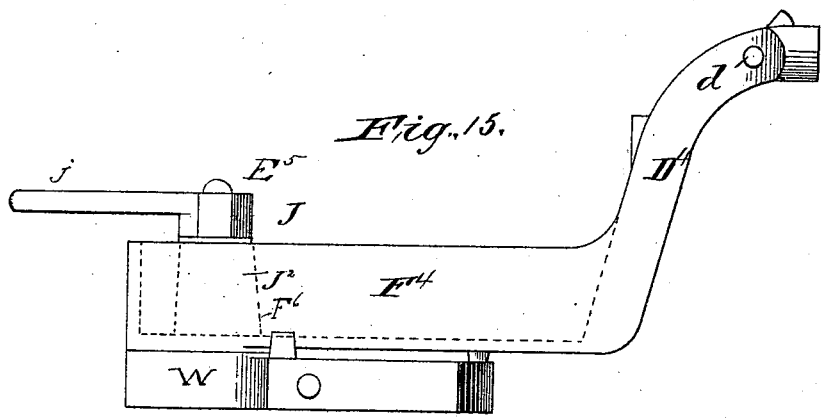

ns.

UNITED STATES PATENT OFFICE.

RUFUS DUTTON, OF NEW YORK, N. Y.

MACHINE FOR GRINDING MOWER-KNIVES.

SPECIFICATION forming part of Letters Patent No. 481,275, dated August 23, 1892.

Application filed December 16, 1890. Serial No. 374,943. (Model.)

*To all whom it may concern:*

Be it known that I, RUFUS DUTTON, a citizen of the United States, and a resident of New York, in the county of New York, State of New York, have invented a certain new and useful Improvement in Machines for Grinding Mower-Knives, of which the following is a specification.

My invention relates to machines for grinding mower-knives, and particularly to certain important and essential modifications in the organization of such machines and in the details of the parts over the construction shown in certain Letters Patent of the United States hitherto granted to me, viz: Letters Patent No. 342,290, dated May 18, 1886; No. 359,964, dated March 22, 1887, and No. 395,615, dated January 1, 1889.

The organization and the function of the machine shown in the present application differs fundamentally from those of the machines disclosed in the patents referred to, first in the mode of pivoting the frame which carries the grinding-wheel and in the consequent method of grinding. In the machines disclosed in the said patents the parts carrying the grinding-wheel, and known collectively as the "grinding-wheel frame," are swiveled to oscillate laterally, as respects the knife-clamp and its frame, about a pivot, which is placed under the grinding-wheel at right angles to the axis of said wheel and substantially on the line of said axis, so that the said pivot, if prolonged, will intersect some part of the periphery of the grinding-wheel, and that some part of said wheel is interposed between the line of the pivot and the knife-clamp. In connection with and as a result of this location of the pivot, the said machines are so organized that when the grinding-wheel is at its two extreme lateral positions it will grind the adjacent and opposite edges of two adjacent knife-sections; but in the present machine the pivot is placed in front of the knife-clamp frame—that is to say, on the side of the knife-clamp frame opposite to the grinding-wheel—so that the knife-clamp is between the pivot and the grinding-wheel; that the pivot, if produced, will not intersect any part of the periphery of said grinding-wheel, but will pass some distance to the front thereof, and that, of course, no part of the grinding-wheel is interposed between the line of the pivot and the knife-clamp. The radial length from the pivot to the grinding-face of the wheel, the width of the said grinding-face, (or, what is the same thing when the wheel is square-faced, the thickness of the grinding-wheel,) and the extreme arc of the lateral oscillation of the grinding-wheel are all so proportioned to each other and to the breadth of a knife-section measured parallel to the knife-clamp that the wheel, when at its extreme lateral positions, will grind both edges of the same knife-section; and in certain forms of the machine I take advantage of this organization to introduce a shiftable pivot, and thus vary the radial distance from the pivot to the face of the grinding-wheel, whereby the wheel will grind knife-sections of different breadths and of different bevels.

In the second place, the machine of this application differs from the machines disclosed in the patents referred to in the means for wetting the grinding-wheel. Some means for thoroughly wetting emery and corundum grinding-wheels is indispensable, and for small wheels revolving rapidly during grinding, as do the wheels of these machines, the trough of the old-fashioned grindstone is impracticable on account of the violent splashing of the water resulting from the rapid rotation. In all my patents before referred to the grinding-wheels are provided with internal water-chambers and the water is forced through the substance of the wheels to the grinding-face by centrifugal force; but in practice the water sometimes passes through the wheel too freely. This is checked by using a diaphragm in the water-chamber, as disclosed in my patent, No. 359,964; but in the present machine I wholly discard the chamber in the wheel and the combination of a grinding-wheel arm, wheel-frame, and water-trough so organized that the grinding-wheel and the water-trough are adjustable with respect to each other. The grinding-machine is now so organized, for the first time in the history of the art, that when not grinding the grinding-wheel can be lowered into the water-trough and slowly turned therein. From its absorbent nature the wheel will, after a few turns, take up sufficient water to grind one or more knife-sections. The machine is further so organized that in order to begin to grind a knife-section at the bottom of the V-notch between two sections the grinding-wheel must be raised out of the water in the trough. The grinding takes place from the bottom of the V-notch upward to the point of the knife-section, so that the wheel is clear of the water during the entire operation of grinding and no splashing is produced.

In the third place, the machine of the present application differs from those of the patents referred to in the use of a peculiar thumb-lever for reciprocating the knife-clamp to and from the grinding-wheel, in the spring organized as a part of the said thumb-lever for throwing the knife-clamp and knife away from the grinding-wheel, and in the method of connecting the thumb-lever with the knife clamp or frame so that the thumb-lever is equally effective in all positions of the grinding-wheel frame and of the knife-clamp.

In the fourth place, the machine of the present application differs from the machines of the patents referred to in the means for fixing the grinding-wheel frame at any desired lateral position.

In the fifth place, it differs in the entirely-different construction of the knife-clamp and its frame, and, finally, the detailed construction departs widely in other respects from that of the patents referred to, as will be apparent from the drawings and the specification of this application.

The drawings show a rectangular-faced grinding-wheel, and I prefer to use such a wheel, yet the construction of the machine may in many of its features be adapted to the use of grinding-wheels with beveled faces without essential modification of the structure and without departing from the essence of the invention. When rectangular-faced wheels are employed, the knife-clamp is arranged to hold the knife-sections substantially perpendicular to the bed of the machine during grinding and the wheel is arranged to revolve in a plane vertical to the bed and to begin grinding on one edge of the face of the wheel and at the bottom of a V-notch between two knife-sections. As the wheel rises from the V-notch to the point of the section, the grinding action takes place across the face of the wheel, which is half as wide as a knife-section. Then in grinding the other edge of the knife-section the wheel begins to grind at its opposite edge, and the grinding action continues back across the face of the wheel in the direction the reverse of that in which the knife-edge first ground traversed the face of the wheel. Thus the whole of the face is evenly worn and the face remains square and true, even after considerable use. This relation of the edge of the knife-section to the face of the grinding-wheel is clearly indicated in Fig. 4, and is also to be observed in Fig. 3.

Figure 2:
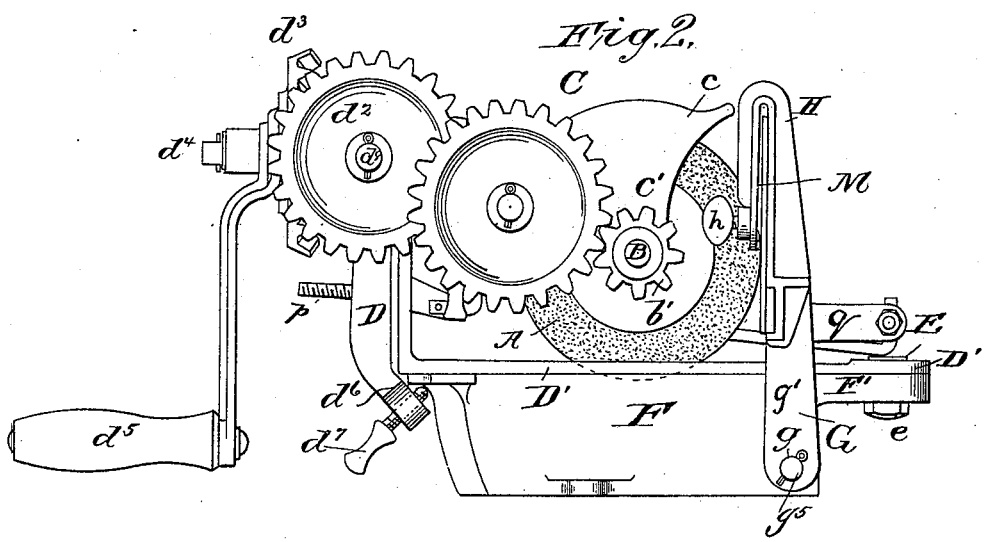
Figure 16:
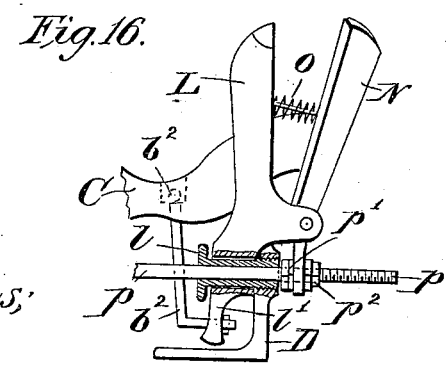
Figure 4:
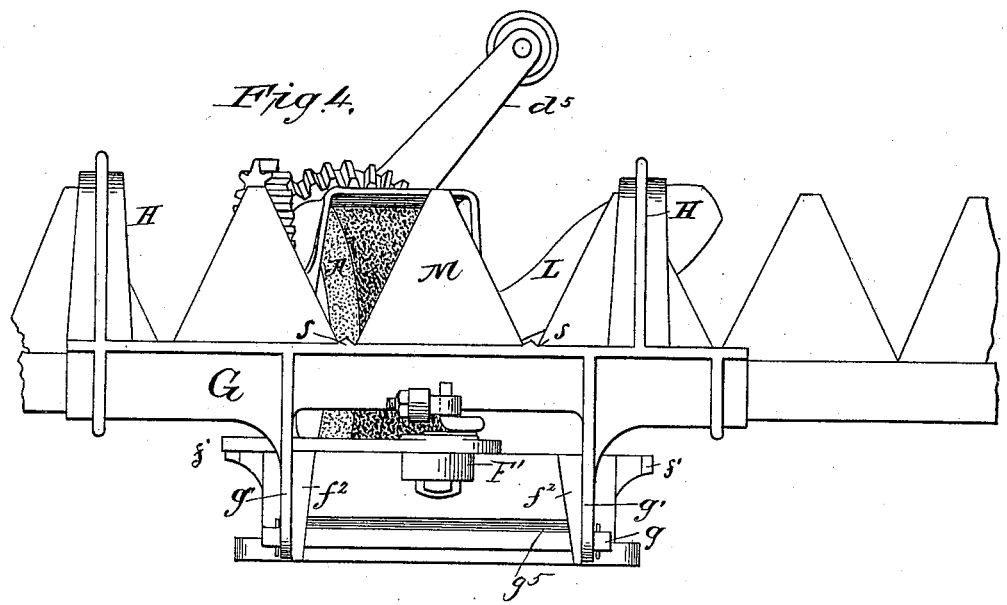
Figure 5:
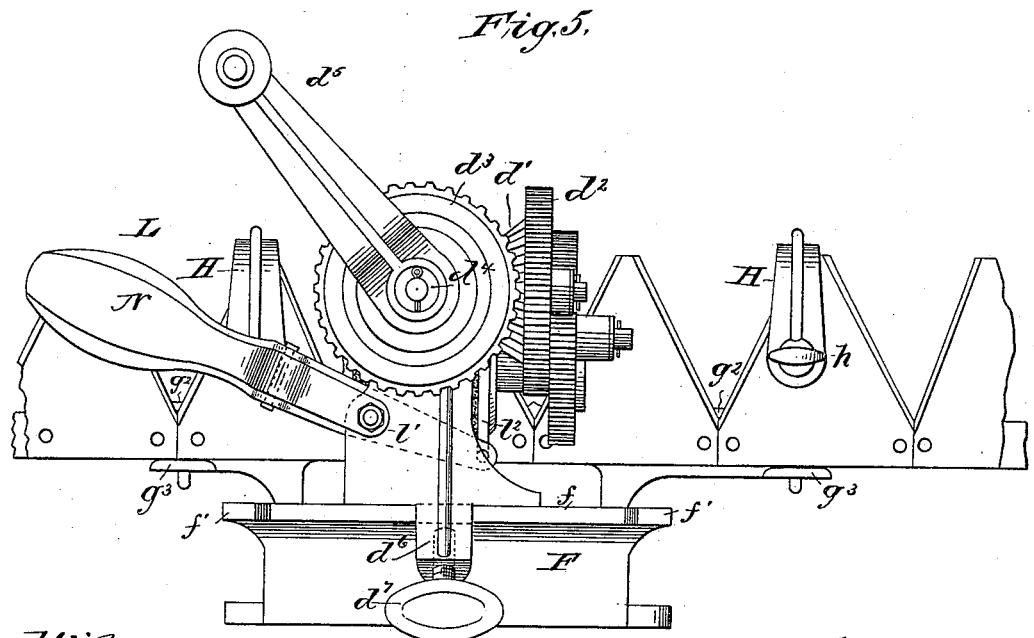
Figure 13:
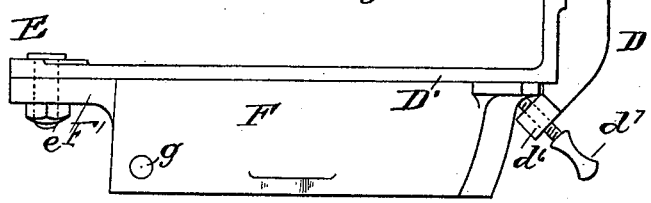
Figure 10:
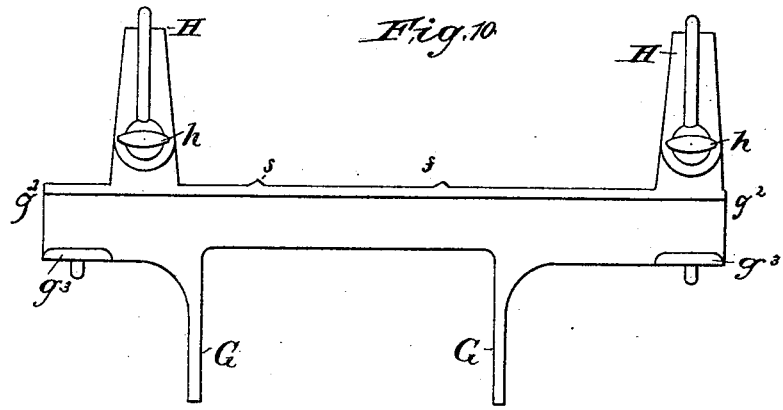

Referring now to the drawings which accompany the specification, Figure 1 is a view of the machine from the thumb-lever side, showing the grinding-wheel at its lowest position and immersed in the water of the trough before grinding. Fig. 2 is a view of the machine from the side opposite to that shown in Fig. 1. The gearing is disclosed and the grinding-wheel is seen at the proper elevation, raised above the water-level of the trough, ready to begin grinding. Fig. 3 is a top or plan view showing the wheel-arm at its extreme right-hand lateral position, the knife-section against the edge of the wheel, and thumb-lever closed to correspond with the position of the knife-clamp. Fig. $3^a$ is a diagram showing how the position of the swiveling-pivot is determined. Fig. 4 is a view from the knife-clamp end, showing the grinding-wheel at its extreme left-hand position and a knife-section in the clamp pressed against the edge of the grinding-wheel ready for beginning grinding. Fig. 5 is a view from the end opposite to that shown in Fig. 4. A device for locking the wheel-arm and frame at any desired lateral position is seen, also the crank and its beveled gear. Fig. 6 is a plan view of the trough and frame as it is in the general form of the machine. Figs. 7 and 8 are respectively plan and side views of a modification of the trough and frame, showing an adjustable pivot and adjustable stop for varying the arc through which the wheel-arm and frame swing laterally. Fig. 9 shows details of the adjustable pivot. Fig. 10 is a view of the face of the knife-clamp and its frame, showing the flange and brackets for guiding and supporting the knife-back. Figs. 11 and 12 are details of a modified form of knife-clamp frame, whereof one of the clamp-jaws is laterally adjustable. Fig. 13 is a side view of the water-trough, base-frame, and wheel-frame with the wheel-arm and gears removed. Figs. 14 and 15 are respectively top and side views of a water-trough which is cast integral with the wheel-frame and forms the oscillating base of the grinding-wheel and its frame. Fig. 16 is an enlarged detail of the thumb-piece for reciprocating the knife-clamp and its pivot.

A is a grinding-wheel of any suitable material, generally from four to six inches in diameter and mounted on a rotatable shaft B, which is supported near its ends in bearings $b\ b$, which are formed in a wheel-arm C. This wheel-arm C is conveniently formed by casting, and is in shape a hood-like top $c$, which covers the grinding-wheel A, and with depending sides $c'\ c'$, in which are formed the aforesaid bearings for the shaft B, and the said wheel-arm C is pivoted on the wheel-frame D by the hinge $d$, which is conveniently constructed of a hinge-rod $d^8$, passed parallel to the shaft B, through ears $c^2\ c^2$ on the wheel-arm C, and through a cylindrical hole in the wheel-frame D, and one end of the rod $d^8$ is utilized as a pivot for a bevel-gear $d'$, which is formed integral with a spur-gear $d^2$. A train of gears is mounted on the wheel-arm C in mesh with said spur-gear $d^2$ and with a pinion $b'$ on the end of the shaft B, and the aforesaid bevel-gear $d'$ meshes with a bevel-gear $d^3$, which is pivoted on a stud $d^4$ on the the wheel-frame D, the plane of stud $d^4$ being perpendicular to the flange-shaft B. A crank $d^5$ is secured to the gear $d^3$, in order to rotate the same and thereby impart motion to the grinding-wheel A. The aforesaid wheel-frame D is cast integral with or is fixed on a base-frame D', which is clearly shown in Fig. 6, and said base-frame D' is formed as a yoke with an internal opening, through which the grinding-wheel A descends when in its lowest position, as in Fig. 1. The sides of said yoke are extended some distance forward of the grinding-wheel A and united into a swiveling plate $D^2$, through which passes the pivot E.

In the construction shown in Figs. 1 to 8, inclusive, the base-frame D' is supported upon and oscillates laterally over the top of a water-trough F, and the aforesaid pivot E is a flat-headed bolt, which descends through an eye in the swiveling plate $D^2$ and an eye in the extension F' of the front end of the trough F, and has a nut $e$ and a washer in the ordinary manner. In this construction, also, the rear end of the water-trough F is formed with a rim or flange $f$, struck on an arc of a circle from the pivot E as a center, and the flange $f$ has shoulders $f'$ $f'$, which limit the oscillation of the base-frame D by engaging with a depending rib $d^5$ $d^6$ on said base-frame D', which rib turns under the flange $f$, as seen clearly in Fig. 1. If it is desired to lock to the base-frame D' at any lateral position, any ordinary locking device to engage with the said flange $f$ may be provided. In the drawings I show such a device, consisting of a set-screw $d^7$, threaded through the depending rib $d^6$ $d^6$, but any other suitable device may be employed. In the aforesaid drawings, Figs. 1 to 8, inclusive, I show a knife-clamp frame G, hinged near the front end of the water-trough F by a hinge $g$, which is readily constructed of a hinge-rod $g^5$, passed transversely and parallel to the grinding-wheel shaft B, through lugs $g'$, depending from the clamp-frame G and ears $f^2$ on the front end of the water-trough F, and the said water-trough F is rounded up a little in front, as shown by dotted lines in Fig. 8, so that the hinge-rod $g^5$ passes below and outside of the rounded front end of the water-trough. The said clamp-frame G is a skeletonized casting and has at each upper corner a knife-clamp H. In the constructions shown in Figs. 1 and 2 the said knife-clamps H are jaws in form of goose-necks, cast integral with the clamp-frame G, and each of said jaws is provided with a set-screw $h$, which may be tightened on a knife-section M to hold same in the jaw during grinding. On the face of the clamp-frame G, adjacent to the grinding-wheel A, is a rib or flange $g^2$, which extends transversely and horizontally across the face of the clamp-frame G and is intended to guide the upper edge of a knife-back when inserting the knife into the clamp. At a suitable distance below the said flange $g^2$, to permit a knife-back to be slid along, and at each end of the clamp-frame G, there are cast short ribs or brackets $g^3$, which are intended to support the bottom of the knife-back. This construction of a continuous upper flange $g^2$ and lower brackets $g^3$ prevents wobbling when inserting the knife into the clamp, and at the same time permits the knife to be more easily slid along than if the brackets $g^3$ were a continuous rib from end to end of the clamp-frame G. The aforesaid construction of knife-clamp frame and clamp-jaws in one integral piece I believe to be new. $s$ $s$ are guides on the knife-clamp frame, indicating to the operator the proper position of the knife-sections. The V-notches between two knife-sections are to be placed exactly at the said guides.

The means for producing the oscillations and reciprocations of the grinding-wheel and the reciprocations of the knife-clamp: From the foregoing description it will be evident to those versed in the art that frames D D' and wheel-arm C, together with the grinding-wheel A, oscillate from side to side about the pivot E, so that when at the right hand the face of the grinding-wheel is at an inclination suitable to grind one bevel and when at the left hand is at an inclination suitable to grind another bevel of a knife-section; also, that the wheel-arm C, together with the grinding-wheel A, reciprocates vertically about the hinge $d$, and thus the grinding-wheel begins to grind a knife-section at the bottom of the V-notch between two sections, as shown in Figs. 2 and 4, and grinds upwardly from thence to the point of the knife-section. The means for producing the several movements are now to be described. I have for the first time organized the lever for reciprocating the grinding-wheel in one structure with the device for reciprocating the knife-clamp and for oscillating the grinding-wheel, so that the operator by one hand can effect all three movements. On the wheel-frame D, near one side, a hand-lever L is pivoted on a hollow pivot $l$, which is threaded into the frame D. This hand-lever L is arranged to project out to the side of the machine in such a position that the operator can stand facing the machine and over the grinding-wheel and with one hand turn the crank $d^5$ while with the other hand he manipulates the hand-lever L, and the said hand-lever L is also so positioned with respect to the horizontal that when the grinding-wheel is raised to its highest position the hand-lever will be near the horizontal, so that the operator has complete control over the lateral oscillations of the grinding-wheel. The inner arm $l'$ of said hand-lever L is connected, through the link $l^2$, with an eye $b^2$, which is secured on the under side of the wheel-arm C and at a point between the hinge $d$ and the axis of the grinding-wheel A. Thus a small movement of the hand-lever L produces a considerable reciprocation of the grinding-wheel. For reciprocating the knife-clamp a thumb-lever N is pivoted on the hand-lever L, and there is a spring O interposed between the arm of the thumb-lever and the hand-lever, so as to throw the thumb-lever away from said hand-lever. The other end of the thumb-lever is connected with a connecting-rod $p$, which leads forward and is pivotally connected with an arm $q$ on the knife-clamp frame G. In order that the connecting-rod P may act properly in all positions of the frame D, the point of connection of the said connecting-rod $p$ with the arm $q$ is directly over the pivot E, and I also prefer to carry the connecting-rod $p$ through the hollow pivot $l$. By this organization, whatever may be the position of the frame D and of the hand-lever L the distance from the point of connection of the connecting-rod $p$ with the arm $q$ to the thumb-lever N remains constant. In order to take the thrust of the thumb-lever in both directions, I place on the connecting-rod $p$ the nuts $p'\,p^2$. Thus it is evident that the operator, by compressing the thumb-lever N, will draw the knife-clamp H toward the face of the grinding-wheel A, and also that he can control the degree of pressure with which he will press a knife-section M, held in said knife-clamp H, against the face of the grinding-wheel. When the operator releases the said thumb-lever N, the spring O throws the knife-clamp away from the wheel, so that the knife-section M can be slid along in the clamp H to a new position.

The organization of the machine with respect to the oscillations and reciprocations of the grinding-wheel and with respect to the water-trough: As hereinbefore said, the machine is so organized as to grind successively the two beveled edges of the same knife-section, and also so that during grinding the wheel A must remain above the water in the trough F, but before grinding can be dipped into the said trough. The necessary movements are effected by the following organization of the machine, which is highly useful and, I believe, novel in the art:

First, as to the oscillations of the grinding-wheel A: In order that said grinding-wheel A shall grind in succession the two edges of the same knife-section, the radial distance of the pivot E from the face of the grinding-wheel A, the width of the face of said grinding-wheel, (or the thickness of said wheel,) and the extreme breadth of a knife-section measured parallel to the knife-clamp frame must all be so proportioned that the face of the grinding-wheel shall describe such an arc between its extreme right-hand and extreme left-hand positions that opposite edges of the face of the grinding-wheel shall come adjacent to the opposite beveled edges of the same knife-section, as illustrated in Figs. 3 and 4, and since the breadth of a knife-section is fixed by the trade the other said elements must be organized together with respect to such standard breadth. This is effected by fixing the pivot E with respect to the width of the face of the wheel A at such a radial distance from the said wheel-face that the chord of the arc through which the face of the wheel swings shall be less than the aforesaid breadth of a knife-section by the width of the face of the grinding-wheel, and in order to determine such a position of the pivot E as will satisfy this condition I have ascertained that said pivot E should be placed at the intersection of the two perpendiculars drawn from the lines of the two beveled edges of the same knife-section and from points on said lines, each of which points is distant inwardly from the extreme edges of the same knife-section a distance equal to one-half the width of the face of the grinding-wheel. The diagram, Fig. 3$^a$, shows the manner of thus determining the position of pivot E, X X and Y Y being the said perpendiculars drawn from the lines of the beveled edges.

Second, in order to provide for dipping the grinding-wheel A into the water-trough F before grinding and for holding it above the water in the trough F during grinding, the wheel-arm C, frames D D', hinge $d$, knife-clamp H, flange $g^2$, and brackets $g^3$ are all so organized with respect to the trough F that the operator can depress the grinding-wheel into the said trough by means of the hand-lever L before he begins grinding; but in order to bring the grinding-wheel to a position where it can begin to grind he must raise the said wheel clear above the water-level in the trough F, and to effect this the said flange $g^2$ and brackets $g^3$ are so placed on the knife-clamp frame G that when a knife is held in the clamp H the bottom of the V-notch between two knife-sections will be at a height above the water-level greater than one-half the diameter of the grinding-wheel A. When the machine is thus organized, the operator lowers the wheel into the water in the trough F before grinding, turns the wheel slowly a few times in the water, then raises it to the proper level to begin grinding at the bottom of the said V-notch, and thus the wheel being clear of the water during grinding its rapid revolutions do not splash the water about. This organization into one machine of a knife-clamp, a reciprocating grinding-wheel, and a water-trough I believe to be new in the art.

In Figs. 7, 8, and 9 are shown a modification of the machine, wherein the pivot $E^3$ is made adjustable, so that the radial distance between said pivot and the face of the grinding-wheel can be varied to grind knife-sections of different breadth or of different bevels. In this construction the pivot $E^3$ is a flat-headed bolt, which is dropped with a working fit down through an eye $e'$, formed in the head of a bolt $e^2$, and also down through a slot $e^3$, which is formed in the extension F⁴ of the water-trough F³, perpendicular to the plane of the axis of the grinding-wheel A. A pinion $e^4$ is placed with a working fit on the lower part of the pivot $E^3$, and meshes with a rack $e^5$ on the under side of said extension F⁴. A lock-nut $e^7$ is placed on the pivot $E^3$ below the pinion $e^4$, so that the pinion $e^4$ can be locked against turning, and thus the pivot E be held fixed at any position in the slot $e^3$; but when the nut $e^7$ is slackened the pinion $e^4$ can revolve and the pivot $E^3$ can be slid along in the slot $e^3$. The aforesaid bolt $e^2$ threads through an eye $e^6$, formed integral with the base-frame D'. To shift the pivot $E^3$, the lock-nut $e^7$ being unscrewed, the said pivot $E^3$ is drawn up out of the eye $e'$, and the eyebolt is then turned until the eye $e'$ comes to the desired position. Then the pivot $E^3$ is dropped through the said eye $e'$ and through the slot $e^3$, the pinion $e^4$ and nut $e^7$ are put on the pivot $E^3$, and the nut is tightened on the pinion, as before. The pivot $E^3$ is formed with shoulders $e^8$, which are wider than the slot $e^3$, and the distance from said shoulders $e^8$ to the under side of the head of the pivot $E^3$ is a little greater than the thickness of the eye $e'$, so that the said eye is always free to turn about the pivot $E^3$. It will be evident that as the distance of the pivot $E^3$ from the face of the grinding-wheel A increases the said grinding-wheel will grind the edges of knife-sections which are broader, measured parallel to the knife-clamp frame, than when the distance of the pivot $E^3$ from the face of the grinding-wheel is less, and also that the greater the said distance the flatter the bevel which may be ground. Although the shifting of the pivot $E^3$ affects the relative position of the point of connection between connecting-rod $p$ and arm $q$ of the clamp-frame G, the displacement is not sufficient in practice to disturb the reciprocation of the knife-clamp H by means of the said connecting-rod $p$ and the thumb-lever N. When a shiftable pivot $E^3$ is used, it is evident that said pivot will not always be the center from which the arc of the rim $f$ on the rear end of the water-trough F is struck; but the eccentricity is too small to affect the oscillation of the wheel-frame D and its locking upon said rim $f$, as hereinbefore described, and a little space may be left between the rib $d^6$ and said rim to allow for said eccentricity.

In Figs. 14 and 15 I show a modification of the machine wherein the water-trough takes the place of the base-frame D'. In this construction the said water-trough F⁴ is cast integral with the wheel-frame D⁴, on which the wheel-arm is hinged, as before; but the trough F⁴ is now pivoted to a bed-plate W, so that the said trough F⁴ oscillates from side to side during the oscillations of the grinding-wheel about a pivot $E^5$, which passes up from the bed-plate W and through a sleeve $J^6$, formed in the water-trough near the front end thereof. For holding the trough F⁴ at any lateral position the pivot $E^5$ has a screw-thread on its upper part, on which threads a handle lock-nut J, as seen in Fig. 15.

When the construction shown in Figs. 14 and 15 is employed, the knife-clamp (not shown in said figures) will be pivoted near the front end of the bed-plate W in a position to bring the said knife-clamp between the swiveling-pivot and the grinding-wheel. The said knife-clamp, pivot, and grinding-wheel are not shown in Figs. 14 and 15, since the construction and arrangement of them will be very clear to those versed in the art from the descriptions hereinbefore contained.

In Fig. 7 is shown an adjustable stop for varying the arc through which the wheel-frame can oscillate, and thereby adapting the machine for grinding different bevels and also knife-sections of different breadths. The said stops $r\ r$ consist of set-screws threaded through ribs on the rear upper corners of the water-trough F. It is evident that the inner ends of the screws $r\ r$ will engage the rib $d^6$ on the wheel-frame $D^5$ at the limits of oscillation and that by shifting one or both of said screws $r$ the arc through which the wheel-frame oscillates can be varied, so that the grinding-wheel will grind sections of different breadths or knife-edges of different bevels.

In Figs. 11 and 12 are shown a broken face view and an end view, respectively, of a modification of a knife-clamp frame which has one oscillating jaw and adjustable brackets for supporting the knife-back. In grinding the last section of a knife the fixed clamp-jaw H is sometimes in the way of the head of the knife. In such cases I use a knife-clamp frame G, having one of the jaws H⁴—viz., that on the left hand and corresponding to the knife-head—swiveled at $h'$ to the knife-clamp frame H⁴, so that the jaw H³ can swing in a plane parallel to the face of the knife-clamp frame and out of the way of the knife-head. It will be understood that the head is always at the left end of the knife, and that the knife is slid along in the knife-clamp frame G from left to right. When the knife-head interferes with the clamp-jaw H⁴, the jaw is swung up out of the way, and then the knife can be slid along to a proper position in the clamp-frame for grinding the section next to the head. In order to adapt the knife-clamp frame to hold the knives with backs of different widths, I may employ adjustable brackets $t^2$ in place of the fixed brackets $g^3$, hereinbefore described. These brackets consist of a screw $t'$ with very broad head $t^3$, as seen in Figs. 11 and 12, and such a bracket is threaded into the knife-clamp from near each end thereof. Then by turning the brackets one way or the other the distance between the flange and the bracket $t^2$ will be accommodated to the width of the knife-back.

I claim—

1. In a mower-knife-grinding machine, a frame for holding a mower-knife and a frame supporting a grinding-wheel, and the said frames swiveled with respect to each other, so that the grinding-wheel grinds in succession the two opposite beveled edges of the same knife-section, as herein described.

2. In machines for grinding mower-knives, a knife-clamp and its frame, a grinding-wheel and its frame, and the said frames swiveled with respect to each other by a pivot which is placed at the intersection of the perpendiculars drawn from the lines of the two opposite beveled edges of the same knife-section and from points on said lines which are each distant inwardly from the extreme edges of the said knife-section one half the width of the face of the grinding-wheel, as described.

3. In a mower-knife-grinding machine, the combination of a knife-clamp and its frame, a grinding-wheel and its frame, a pivot swiveling the two frames with respect to each other and the said pivot placed in front of the grinding-wheel a greater distance than is the knife-clamp, and stops for restricting the lateral oscillations of the grinding-wheel to such an arc that the grinding-wheel will grind in succession the two opposite beveled edges of the same knife-section, as described.

4. In a mower-knife-grinding machine, the combination of a knife-clamp and its frame, a grinding-wheel and its frame, a pivot swiveling the said frames with respect to each other and the said pivot placed in front of the grinding-wheel a greater distance than is the knife-clamp, stops for restricting the lateral oscillations of the grinding-wheel to such an arc that the grinding-wheel will grind in succession the two opposite beveled edges of the same knife-section, and means for locking the grinding-wheel frame in any lateral position, as described.

5. In a mower-knife-grinding machine, the combination of a knife-clamp adapted to hold a knife substantially vertical and a knife-clamp frame, a grinding-wheel mounted in a wheel-arm which is hinged parallel to the axis of the grinding-wheel on a wheel-frame, a pivot swiveling the knife-clamp frame and the wheel-frame with respect to each other and placed at a greater distance in front of the grinding-wheel than is the knife-clamp, a lever pivoted on the wheel-frame, and a link connecting an arm of the lever with the wheel-arm at a point between the wheel-arm hinge and the axis of the grinding-wheel, as described.

6. In mower-knife-grinding machines having an oscillating and reciprocating grinding-wheel and a reciprocating knife-clamp, the means organized into a single lever controlled by one hand of the operator for reciprocating and oscillating the grinding-wheel and for reciprocating the knife-clamp, herein described.

7. The combination, in a mower-knife-grinding machine, of a grinding-wheel mounted in a frame, a knife-clamp frame hinged parallel to the axis of the grinding-wheel, a compressible thumb-lever pivoted on the wheel-frame, a connecting-rod connecting an arm of the thumb-lever with the knife-clamp frame, and a spring in the thumb-lever adapted to throw the knife-clamp frame away from the face of the grinding-wheel, as described.

8. The combination, in a mower-knife-grinding machine, of a grinding-wheel and its frame, a knife-clamp frame hinged parallel with the axis of the grinding-wheel, a pivot swiveling the said frames with respect to each other, a compressible thumb-lever pivoted on the wheel-frame, a connecting-rod having one of its ends pivotally connected with the knife-clamp frame at a point substantially on line with the aforesaid swiveling-pivot and its other end connected with the thumb-lever, and a spring in the thumb-lever adapted to throw the knife-clamp frame away from the grinding-wheel, as described.

9. In mower-knife-grinding machines having hinged and swiveled knife-clamp frames and wheel-frames, the means for reciprocating the knife-clamp frame and for reciprocating and swiveling the wheel-frame herein described, to wit: a hand-lever pivoted on the wheel-frame by a hollow pivot, a compressible thumb-lever pivoted on the hand-lever, a rod passing through the hollow pivot and connecting the thumb-lever with the knife-clamp frame at a point which is substantially in line with the swiveling-point of the wheel-frame, and a spring in the thumb-lever for throwing the knife-clamp frame away from the grinding wheel, as described.

10. In mower-knife-grinding machines, a vibratory knife-clamp having the frame, the pivotal supports, the guide-seat for the knife, and a jaw or jaws, all in one integral piece, as described.

11. In mower-knife-grinding machines, a knife-clamp frame, knife-clamp jaws, a flange across the face of the knife-clamp frame for guiding the upper edge of a knife-back, and brackets on the face of the knife-clamp frame for supporting the lower edge of a knife-back, all formed in one integral piece, as described.

12. In a mower-knife-grinding machine, a knife-clamp and its frame, a grinding-wheel mounted on a reciprocating arm, and a water-trough, and the whole so organized that the grinding-wheel dips into the water in the trough when at rest and is raised above the water in the trough during grinding, as described.

13. In a mower-knife-grinding machine, the grinding-wheel mounted in a frame which is pivoted to oscillate laterally over the front end of a water-trough, and the rear end of said water-trough shaped as an arc of a circle struck from the pivot as a center, and stops on the rear end of the water-trough to limit the oscillations of the wheel-frame, as described.

14. In mower-knife-grinding machines, a grinding-wheel swiveled to oscillate laterally on a pivot near the front end of a water-trough, and the rear end of the water-trough shaped as an arc of a circle struck from the pivot as a center, and adjustable stops on the rear end of the trough to vary the arc through which the wheel-frame oscillates, as described.

15. In mower-knife-grinding machines, the combination of a knife-clamp and its frame, a grinding-wheel and its frame, a pivot swiveling the two frames with respect to each other, and means for varying the distance between the pivot and the face of the grinding-wheel, as described.

16. In mower-knife-grinding machines, a knife-clamp mounted on a frame which is hinged to a base, a grinding-wheel mounted in a wheel-frame on an axis parallel to knife-clamp-frame hinge, and the wheel-frame swiveled on the base by a shiftable pivot, a slot in which the pivot plays, formed in the base perpendicular to the axis of the wheel, and means for locking the pivot in the slot, as described.

17. In mower-knife-grinding machines having a grinding-wheel frame and a knife-clamp frame swiveled with respect to each other, a shiftable swiveling-pivot consisting of a swiveling-bolt passed with a working fit through the head of an eyebolt, the said eyebolt threading in the grinding-wheel frame and the said swiveling-bolt passing through a slot in the base of a machine, a pinion with a working fit on the swiveling-bolt and meshing with a rack on the base of the machine, and a lock-nut on the swiveling-bolt to lock the pinion, as described.

In testimony that I claim the foregoing as my invention I have signed my name, in presence of two witnesses, this 8th day of October, 1890.

RUFUS DUTTON.

Witnesses:
  BERNARD J. ISECKE,
  JERRY E. SMOOT.